(12) United States Patent
Li et al.

(10) Patent No.: US 11,350,503 B2
(45) Date of Patent: May 31, 2022

(54) POWER CONVERTER

(71) Applicant: Silergy Semiconductor Technology (Hangzhou) LTD, Hangzhou (CN)

(72) Inventors: Jian Li, Hangzhou (CN); Wei Chen, Hangzhou (CN)

(73) Assignee: Silergy Semiconductor Technology (Hangzhou) LTD, Hangzhou (CN)

(*) Notice: Subject to any disclaimer, the term of this patent is extended or adjusted under 35 U.S.C. 154(b) by 0 days.

(21) Appl. No.: 17/147,640

(22) Filed: Jan. 13, 2021

(65) Prior Publication Data
US 2021/0227664 A1    Jul. 22, 2021

(30) Foreign Application Priority Data

Jan. 22, 2020 (CN) .................. 202010074974.X

(51) Int. Cl.
| | |
|---|---|
| *H05B 45/30* | (2020.01) |
| *H05B 45/385* | (2020.01) |
| *H05B 45/34* | (2020.01) |
| *H05B 45/345* | (2020.01) |
| *H02M 1/08* | (2006.01) |
| *H02M 3/335* | (2006.01) |
| *H02M 1/00* | (2006.01) |

(52) U.S. Cl.
CPC .......... *H05B 45/385* (2020.01); *H02M 1/08* (2013.01); *H02M 3/33576* (2013.01); *H05B 45/34* (2020.01); *H05B 45/345* (2020.01); *H02M 1/009* (2021.05)

(58) Field of Classification Search
CPC ........ H05B 45/37; H05B 45/46; H05B 45/50; H05B 45/52; H05B 45/347; H05B 45/385; H02M 3/33561; H02M 3/33576
See application file for complete search history.

(56) References Cited

U.S. PATENT DOCUMENTS

| | | | |
|---|---|---|---|
| 5,619,403 A * | 4/1997 | Ishikawa ........... | H02M 3/33561 363/131 |
| 7,227,277 B2 | 6/2007 | Chapman et al. | |
| 7,256,568 B2 | 8/2007 | Lam et al. | |
| 8,310,846 B2 | 11/2012 | Piazzesi | |
| 8,513,895 B2 * | 8/2013 | Yang ................. | H05B 45/46 315/307 |
| 8,853,888 B2 | 10/2014 | Khaligh | |
| 9,130,460 B2 | 9/2015 | Sun et al. | |
| 9,257,916 B2 | 2/2016 | Cheng et al. | |

(Continued)

*Primary Examiner* — Tung X Le

(57) ABSTRACT

A power converter can include: an input circuit, including a primary winding and a primary power switch which are coupled in series between an input terminal and a first ground; at least one constant voltage output circuit, including a first secondary winding coupled with said primary winding; and at least one constant current output circuit, including a second secondary winding coupled with said primary winding, a secondary power switch, a current output port, a second rectifier circuit and a current sampling circuit. The second rectifier circuit can be coupled between the current output port and the second secondary winding, the current output port can be coupled to an LED as a load, the LED may be coupled between one end of the second secondary winding and a second ground, and the secondary power switch and the current sampling circuit can connect in series.

18 Claims, 9 Drawing Sheets

(56) References Cited

U.S. PATENT DOCUMENTS

| | | | |
|---|---|---|---|
| 9,543,822 B2 | 1/2017 | Hang et al. | |
| 9,559,591 B2 | 1/2017 | Hang et al. | |
| 9,900,942 B1* | 2/2018 | Eggermont | H02M 1/44 |
| 2007/0052397 A1 | 3/2007 | Thompson et al. | |
| 2008/0231115 A1 | 9/2008 | Cho et al. | |
| 2008/0258688 A1 | 10/2008 | Hussain et al. | |
| 2012/0104956 A1* | 5/2012 | Yang | H05B 45/347 |
| | | | 315/201 |
| 2012/0153729 A1 | 6/2012 | Song et al. | |
| 2013/0063180 A1 | 3/2013 | Sun et al. | |
| 2014/0063867 A1* | 3/2014 | Djenguerian | H02M 3/33507 |
| | | | 363/21.17 |
| 2014/0239810 A1* | 8/2014 | Martin-Lopez | H05B 45/3725 |
| | | | 315/85 |
| 2015/0078045 A1 | 3/2015 | Zhang et al. | |
| 2016/0211745 A1 | 7/2016 | Hang et al. | |
| 2017/0063238 A1 | 3/2017 | Hang et al. | |
| 2017/0279279 A1 | 9/2017 | Shimada et al. | |
| 2018/0198361 A1 | 7/2018 | Seong et al. | |
| 2018/0336843 A1* | 11/2018 | Xie | G09G 3/3413 |
| 2019/0208589 A1* | 7/2019 | Satterfield | H05B 45/46 |

* cited by examiner

POWER CONVERTER

RELATED APPLICATIONS

This application claims the benefit of Chinese Patent Application No. 202010074974.X, filed on Jan. 22, 2020, which is incorporated herein by reference in its entirety.

FIELD OF THE INVENTION

The present invention generally relates to the field of power electronics, and more particularly to power converters.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In some approaches, a driving power supply applied for an LED back light typically has multiple output ports. At least one constant current output port can be used for providing a driving current to an LED, and at least one constant voltage output port may be used for supplying electric energy to the system and other loads.

Figure 1:
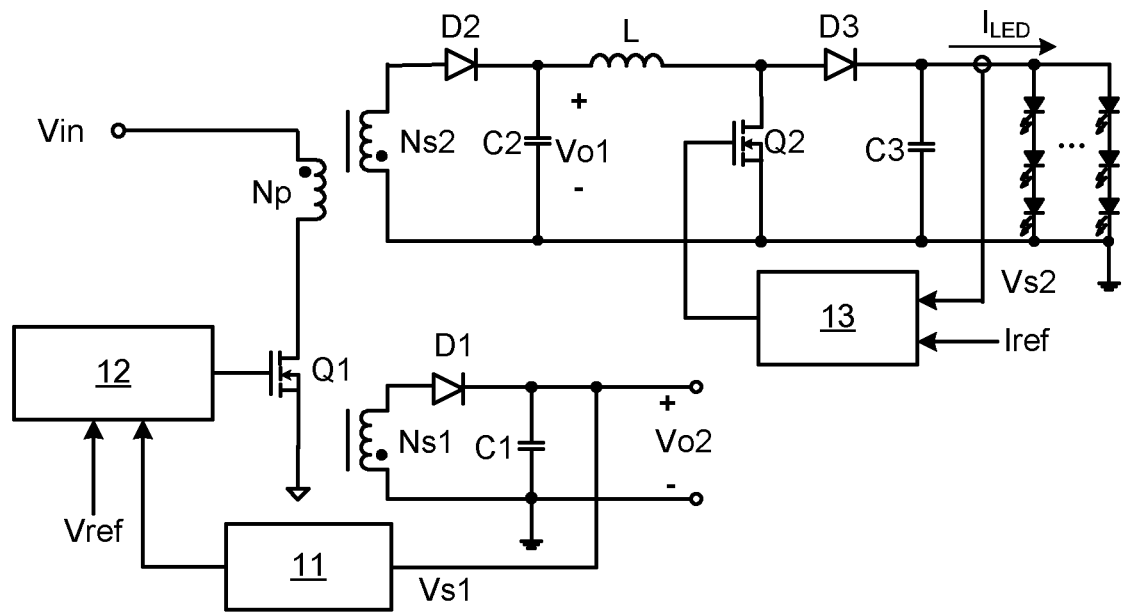
FIG. 1 is a schematic block diagram of an example power converter having multiple output terminals, including a constant voltage output port and a constant current output port.

Referring now to FIG. 1, shown is a schematic block diagram of an example power converter having multiple output terminals, including a constant voltage output port and a constant current output port. In this example, power converter 1 may provide multiple output ports by utilizing a plurality of secondary windings of a transformer. Each secondary winding can be connected to an output circuit. In a constant current output circuit, secondary winding Ns2 can be coupled to primary winding Np. Primary power switch Q1 can connect in series with the primary winding and is controlled to be turned on and off, so that a square wave voltage is generated between two ends of secondary winding Ns2. Diode D2 and capacitor C2 may perform a function of a rectifier circuit that rectifies and filters the square wave voltage and provides a relatively constant output voltage Vo1. Inductor L, power switch Q2, diode D3, and capacitor C3 may perform a function of a boost-type power converter, which can connect between the rectifier circuit and an LED.

The boost-type power converter can be controlled by constant current control circuit 13 to convert output voltage Vo1 into constant output current $I_{LED}$, and may supply constant output current $I_{LED}$ to the LED load. Constant current control circuit 13 can generate a control signal in accordance with current sampling signal Vs2 and current reference signal Iref. In the constant voltage output circuit, secondary winding Ns1 can be coupled to primary winding Np. Diode D1 and capacitor C1 may perform a function of a rectifier circuit that rectifies and filters a voltage generated between two ends of secondary winding Ns1 and provides constant output voltage Vo2. Voltage sampling signal Vs1 representing output voltage Vo2 can be transferred to the primary side of the power converter by optocoupler circuit 11. Constant voltage control circuit 12 can control on and off states of primary power switch Q1 in accordance with voltage sampling signal Vs1 and reference voltage Vref so that output voltage Vo2 maintains constant. Thus, this example power converter can provide a constant current output and a constant voltage output by two-stage power stage circuit. However, the two-stage power conversion in the constant current output circuit can increase conversion loss and decrease conversion efficiency. Moreover, the two-stage power circuit needs two magnetic components, which increases a size of the system.

In particular embodiments, a power converter can include: an input circuit, including a primary winding and a primary power switch which are coupled in series between an input terminal and a first ground; at least one constant voltage output circuit, including a first secondary winding coupled with said primary winding; and at least one constant current output circuit, including a second secondary winding coupled with said primary winding, a secondary power switch, a current output port, a second rectifier circuit and a current sampling circuit. The second rectifier circuit can be coupled between the current output port and the second secondary winding, the current output port can be coupled to an LED as a load, the LED may be coupled between one end of the second secondary winding and a second ground, and the secondary power switch and the current sampling circuit can connect in series between the other end of the second secondary winding and the second ground.

In addition, a reflected voltage reflected from an output voltage of the second secondary winding to the first secondary winding may be less than an output voltage of the first secondary winding so that the constant voltage output circuit is disabled when the secondary power switch is turned on. Further, the primary power switch and the secondary power switch may have the same switching cycle, and the secondary power switch can be turned on for at least a portion of a period during which the primary power switch is turned off, such that an output current of the constant current output circuit maintains constant. Further, one power end of the secondary power switch can be coupled to the second ground through the current sampling circuit.

In certain embodiments, an anode of the LED may be coupled to the second ground, and a first sampling signal representing a voltage of a cathode of the LED may be sampled to determine whether the LED is short-circuited or open-circuited. When the first sampling signal is less than a first threshold, it can be determined that the LED is open-circuited, where the first threshold is a negative value. Also, when the first sampling signal is greater than a second threshold, and a time period during which the first sampling signal is greater than the second threshold reaches a first time threshold, it may be determined that the LED is short-circuited, where the second threshold is a negative value. Further, the secondary power switch can be an N-type MOS, and the source of the secondary power switch is coupled to the second ground through the current sampling circuit.

In particular embodiments, a cathode of the LED may be coupled to the second ground, and a first sampling signal representing a voltage of an anode of the LED is sampled to determine whether the LED is short-circuited or open-circuited. When the first sampling signal is greater than a first threshold, it can be determined that the LED is open-circuited, where the first threshold is a positive value. Also, when the first sampling signal is less than a second threshold, and a time period during which the first sampling signal is less than the second threshold reaches a first time threshold, it can be determined that the LED is short-circuited, where the second threshold is a positive value. Further, the secondary power switch can be a P-type MOS, and the source of the secondary power switch may be coupled to the second ground through the current sampling circuit.

The power converter can also include a first module that includes a voltage sampling circuit and a second module. The voltage sampling circuit can generate a first sampling signal that represents a voltage of a non-ground end of the LED, and the second module receives the first sampling signal to determine whether the LED is short-circuited or open-circuited. The second module can include first and second comparators, and a timing comparison circuit. A first input end of the first comparator may receive the first sampling signal, a second input end of the first comparator can receive a first threshold, and an output end of the first comparator outputs a first signal to determine whether the LED is open-circuited. Also, a first input end of the second comparator can receive the first sampling signal, a second input end of the second comparator may receive a second threshold, and an output end of the second comparator is coupled to the timing comparison circuit, and the timing comparison circuit can output a second signal to determine whether the LED is short-circuited.

When the first signal is in the first state, it may be determined that the LED is open-circuited, and when the first signal is in the second state, it can be determined that the LED is not open-circuited. When the second signal is in the first state, it may be determined that the LED is short-circuited, and when the second signal is in the second state, it may be determined that the LED is not short-circuited. For example, the first state is a low level state, and the second state is a high level state. In other examples, the first state is the high level state, and the second state is the low level state.

Figure 2:
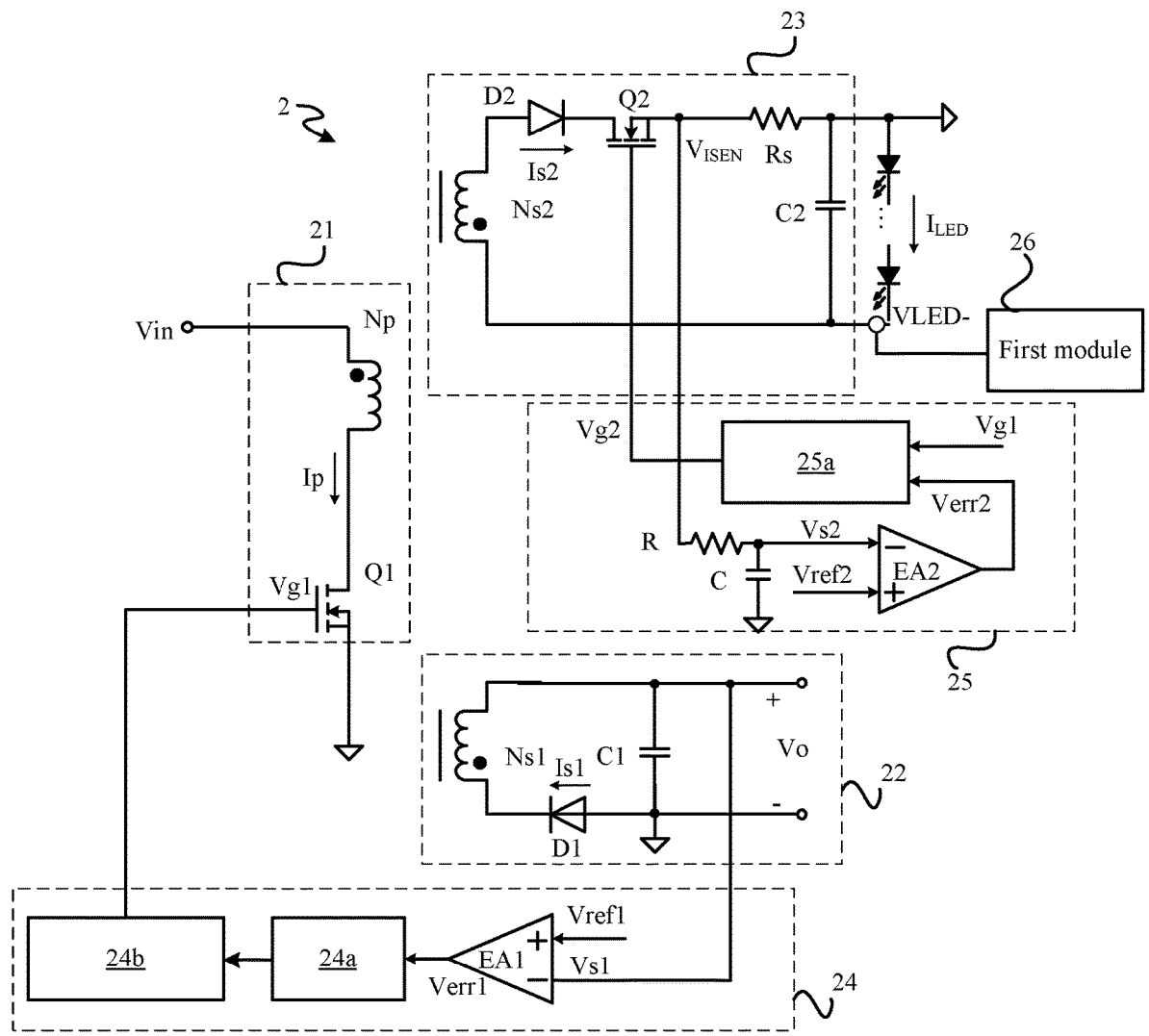
FIG. 2 is a schematic block diagram of first example power converter, in accordance with embodiments of the present invention.

Referring now to FIG. 2, shown is a schematic block diagram of first example power converter, in accordance with embodiments of the present invention. In this particular example, power converter 2 can include input circuit 21, at least one constant voltage output circuit 22, at least one constant current output circuit 23, control circuit 24, control circuit 25, and module/circuit 26. Input circuit 21 can include primary winding Np and primary power switch Q1. Primary winding Np and primary power switch Q1 can connect in series between an input terminal and a first ground. Voltage Vin at the input terminal may be obtained from an AC voltage after being rectified by a rectifier bridge and then filtered by an input capacitor.

Constant voltage output circuit 22 can include secondary winding Ns1 coupled with primary winding Np. Constant current output circuit 23 can include secondary winding Ns2 coupled with primary winding Np. Primary winding Np, secondary winding Ns1, and secondary winding Ns2 may form a transformer. In particular embodiments, constant current output circuit 23 can include secondary power switch Q2 connected in series with secondary winding Ns2. When primary power switch Q1 is turned off and secondary power switch Q2 is turned on, constant current output circuit 23 may at least partially be conducted. In this example, constant current output circuit 23 is completely conducted in such case. When secondary power switch Q2 is turned off, constant current output circuit 23 may at least be partially disabled. In this embodiment, constant current output circuit 23 completely disabled in such case.

In particular embodiments, constant voltage output circuit 22 and constant current output circuit 23 can control a reflected voltage from an output voltage of secondary winding Ns2 to secondary winding Ns1 is less than an output voltage of secondary winding Ns1 when secondary power switch Q2 is turned on, such that constant voltage output circuit 22 is disabled by a rectifier device (e.g., diode D1 in the rectifier circuit) when primary power switch Q1 is turned off and secondary power switch Q2 is turned on. That is, a freewheeling current flowing through constant voltage output circuit 22 can be zero, or near zero. This control method can be achieved by adjusting a turns ratio of secondary winding Ns1 and secondary winding Ns2, or the like. Due to an effect of electromagnetic induction, a voltage between two ends of secondary winding Ns1 and a voltage between two ends of secondary winding Ns2 can increase when primary power switch Q1 is turned off. Since the reflected voltage from the output voltage of secondary winding Ns2 to secondary winding Ns1 is less than the output voltage of secondary winding Ns1 when constant current output circuit 23 is conducted (e.g., when primary power switch Q1 is turned off and secondary power switch Q2 is turned on), diode D2 can be turned on and the freewheeling current may begin to flow in constant current output circuit 23 when a voltage across secondary winding Ns2 reaches its output voltage.

In addition, the reflected voltage from the output voltage of secondary winding Ns2 to secondary winding Ns1 may be less than the output voltage of secondary winding Ns1, so diode D1 can be turned off, and constant voltage output circuit 22 disabled. Because energy accumulated in the magnetic component may be released by secondary winding Ns2, no freewheeling current may flow through first secondary windings Ns1. Thus, the energy that is accumulated in primary winding Np can be released through a circuit that is connected to secondary winding Ns1 (e.g., through constant current output circuit 23). In addition, the freewheeling current flowing through constant voltage output circuit 22 can be zero, or nearly zero. When constant current output circuit 23 is disabled (e.g., secondary power switch Q2 is turned off), primary winding Np may release energy through constant voltage output circuit 22, and the freewheeling current can flow through constant voltage output circuit 22. Therefore, the freewheeling current may flow through the constant current output circuit and the constant voltage output circuit in a time division manner by controlling secondary power switch Q2 to be turned on and off.

Constant voltage output circuit 22 may include secondary winding Ns1, a voltage output port, and a first rectifier circuit. The first rectifier circuit can be electrically coupled between the voltage output port and secondary winding Ns1. The first rectifier circuit can include diode D1 and capacitor C1. In addition, control circuit 24 can control primary power switch Q1 to be turned on and off so as to adjust an output parameter (e.g., output voltage Vo) of constant voltage output circuit 22. For example, control circuit 24 can obtain voltage sampling signal Vs1 by sampling output voltage Vo, may obtain error compensation signal Verr1 in accordance with voltage reference signal Vref1 that represents an expected output voltage and voltage sampling signal Vs1, and can generate control signal Vg1 in accordance with error compensation signal Verr1 to control primary power switch Q1 to maintain output voltage Vo constant.

Control circuit 24 may include error amplifier circuit EA1, optocoupler circuit 24a, and control signal generating circuit 24b. Error amplifier circuit EA1 can generate error compensation signal Verr1 in accordance with voltage sampling signal Vs1 and voltage reference signal Vref1. Optocoupler circuit 24a may transfer error compensation signal Verr1 from the secondary side to the primary side of the power converter, specifically to first control signal generating circuit 24b, in an optocoupling manner. Control signal generating circuit 24b can generate control signal Vg1 in accordance with error compensation signal Verr1 to control primary power switch Q1.

Any suitable control circuit that controls the primary power switch in accordance with the output voltage to provide a constant voltage output may be utilized in certain embodiments. Constant current output circuit 23 may include secondary winding Ns2, a current output port, a second rectifier circuit, current sampling circuit Rs, and secondary power switch Q2. The second rectifier circuit may be electrically coupled between the current output port and secondary winding Ns2. The second rectifier circuit can include diode D2 and capacitor C2.

Current sampling circuit Rs and secondary power switch Q2 can connect in series in the constant current output circuit (e.g., connected in series with secondary winding Ns2). As shown in FIG. 2, current sampling circuit Rs can be a sampling resistor connected between a second ground and the first end of secondary power switch Q2. The second end of secondary power switch Q2 can be coupled with one end of secondary winding Ns2. In this example, the constant current output circuit can connect to an LED as a load. The LED can connect to the current output port, and the anode of the LED may be coupled to the second ground, in order to facilitate sampling the voltage on the LED to determine whether the LED is short-circuited or open-circuited. The cathode of the LED can connect to the other end of secondary winding Ns2. In addition, in order to facilitate current sampling, one end of the sampling resistor may be coupled to the second ground, and one power end of the secondary power switch can be coupled to the second ground through the sampling resistor, which can facilitate drive and control of the secondary power switch. For example, LED can be integrated with the entire power converter. Optionally, the secondary power switch can be an N-type MOS transistor.

Control circuit 25 can average current sampling signal $V_{ISEN}$, which may be sampled by current sampling circuit Rs, in order to obtain average sampling signal Vs2 that represents an average current flowing through the LED. Control circuit 25 can generate control signal Vg2 in accordance with average sampling signal Vs2, current reference signal Vref2 that represents a desired output current, and control signal Vg1 (or a parameter that represents control signal Vg1), in order to control secondary power switch Q2 to maintain an average value of the output current to be constant. For example, when control signal Vg1 is at a high level, primary power switch Q1 may be turned on and the voltage on the primary winding rises, such that the voltages on secondary windings both rise. In this way, the voltage on the first or second secondary winding can be used to represent the on and off states of the primary power switch. Therefore, the parameter that represent control signal Vg1 can be the voltage on the first or second secondary winding.

Control circuit 25 can control the turn-off moment of the secondary power switch according to current sampling signal $V_{ISEN}$ and current reference signal Vref2. Control circuit 25 can control the turn-on moment of the secondary power switch by control signal Vg1 (or a parameter which represents control signal Vg1). Optionally, secondary power switch Q2 can be turned on when primary power switch Q1 is turned off. In other examples, secondary power switch Q2 may be turned on when primary power switch Q1 is turned on. Control circuit 25 can control secondary power switch Q2 to be turned on and off so that the freewheeling current flows through constant voltage output circuit 22 and constant current output circuit 23 in a time division manner when primary power switch Q1 is turned off, which can provide multiple constant current/voltage outputs. In addition, a time duration during which the freewheeling current flows through constant current output circuit 23 may be adjusted to control a value of the output current of constant current output circuit 23.

Control circuit 25 may include an averaging circuit, error amplifier circuit EA2, and control signal generating circuit 25a. The averaging circuit can include resistor R and capacitor, and may be an RC circuit for averaging current sampling signal $V_{ISEN}$. Average sampling signal Vs2 can be obtained after averaging current sampling signal $V_{ISEN}$ is provided to error amplifier circuit EA2. Error amplifier circuit EA2 may generate error compensation signal Verr2 in accordance with average sampling signal Vs2 and current reference signal Vref2. Control signal generating circuit 25a can generate control signal Vg2 in accordance with error compensation signal Verr2 and control signal Vg1 (or a parameter which represents control signal Vg1), in order to control secondary power switch Q2. Any suitable control circuit that controls the secondary power switch in accordance with the output current to provide a constant current output may be utilized in certain embodiments.

Moreover, in the case of dimming the LED (e.g., adjusting a value of the output current), current reference signal Vref2 may be adjusted according to a dimming signal to change the desired output current, in order to adjust a value of the output current. In other embodiments, the LED dimming can also be performed in other ways. For example, power switch Q5 may be connected between the anode of the LED and the second ground, the control end of power switch Q5 can receive dimming signal Vg5, and power switch Q5 may adjust the value of the output current according to dimming signal Vg5. Also, power switch Q5 can connect to the cathode of the LED.

Figure 3:
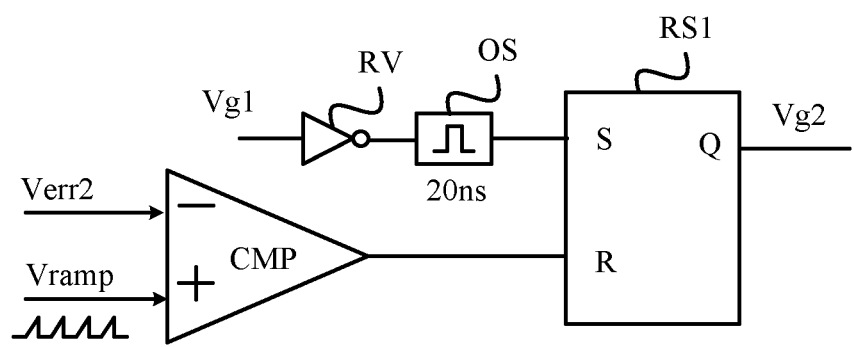
FIG. 3 is a schematic block diagram of an example of a second control signal generating circuit, in accordance with embodiments of the present invention.

Referring now to FIG. 3, shown is a schematic block diagram of an example of a second control signal generating circuit, in accordance with embodiments of the present invention. In this particular example, control signal generating circuit 25a may include RS flip-flop RS1, inverter RV, one-shot circuit OS, and comparator CMP. The output terminal of inverter RV can connect to a set terminal of RS flip-flop RS1 through one-shot circuit OS. In addition, the input terminals of comparator CMP may receive error compensation signal Verr2 and periodic ramp signal Vramp, and the output terminal of comparator CMP can connect to a reset terminal of RS flip-flop RS1. One-shot circuit OS can output a pulse signal with a predetermined duration (e.g., 20 ns) when a rising edge of an input signal is detected. The input terminal of inverter RV may receive control signal Vg1, and the output terminal of RS flip-flop RS1 can output control signal Vg2. Thus, when control signal Vg1 switches to a low level, primary power switch Q1 can be turned off. One-shot circuit OS may activate the pulse signal at that time point to set RS flip-flop RS1. Thus, control signal Vg2 can switch to a high level, and secondary power switch Q2 may be turned on. It should be noted that in other examples, primary power switch Q1 and secondary power switch Q2 can be turned on at the same time. In other examples, control signal Vg1 can be replaced by a parameter characterizing control signal Vg1.

Figure 4:
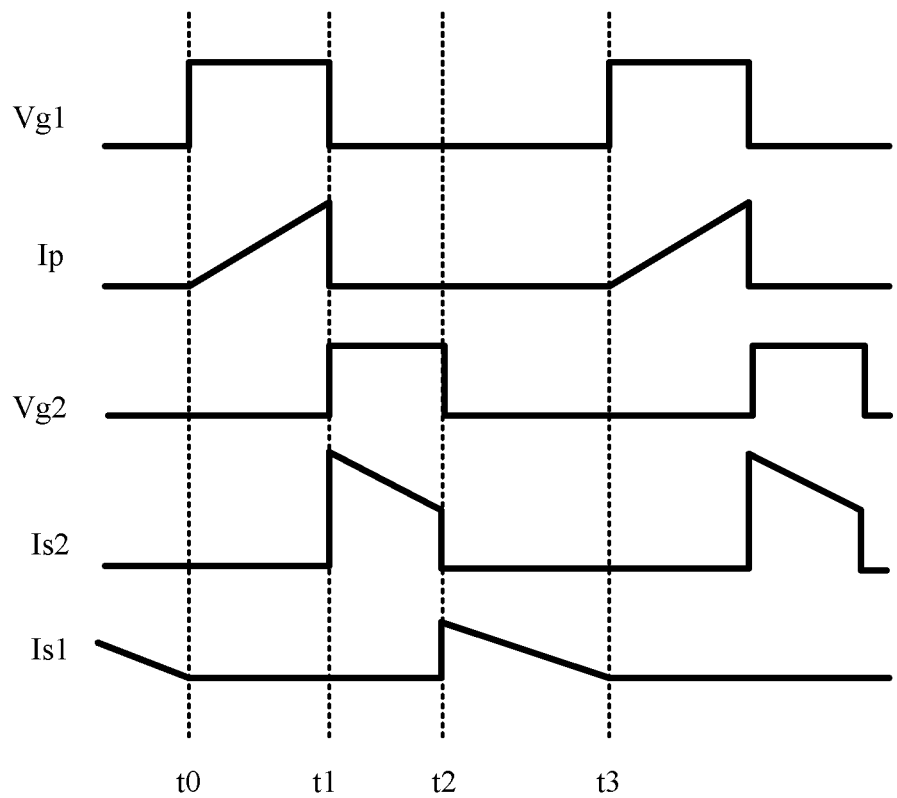
FIG. 4 is a waveform diagram of example operation of the first example power converter, in accordance with embodiments of the present invention.

Referring now to FIG. 4, shown is a waveform diagram of example operation of the first example power converter, in accordance with embodiments of the present invention. In this particular example, in a time period from time t0 to t1, control signal Vg1 is at a high level, and primary power switch Q1 is turned on. Current Ip flowing through primary winding Np can increase from zero. Diodes D1 and D2 in the rectifier circuits of constant voltage output circuit 22 and constant current output circuit 23 at the secondary side may be reverse biased and in an off state. Also, there may be no current flowing through the two output circuits.

In the example control signal generating circuit of FIG. 3, at time t1, control signal Vg1 switches to a low level, and primary power switch Q1 is turned off. One-shot circuit OS can activate the pulse signal at this time point to set RS flip-flop RS1. Thus, control signal Vg2 may switch to a high level, and secondary power switch Q2 can be turned on. In a time period from time t1 to t2, secondary power switch Q2 can be turned on. When secondary power switch Q2 is turned on, energy stored in the primary winding may be released only through constant current output circuit 23. Current Is2 flowing through secondary winding Ns2 can continuously decrease from a peak value, and current Is1 flowing through secondary winding Ns1 may be zero, or nearly zero. At time t2, ramp signal Vramp can increase to be a value greater than error compensation signal Verr2, RS flip-flop RS1 may be reset, and control signal Vg2 can switch to a low level.

In a time period from time t2 to t3, control signal Vg1 can be maintained at a low level, and primary power switch Q1 may be turned off. In addition, control signal Vg2 can be maintained at a low level, and secondary power switch Q2 can be turned off. In such a case, constant current output circuit 23 may be disabled, and the freewheeling current may flow only through constant voltage output circuit 22. Current Is2 flowing through secondary winding Ns2 is zero, and current Is1 flowing through secondary winding Ns1 can continuously decrease from a peak value, such that energy is supplied to the voltage output port.

At time t3, control signal Vg1 may switch to a high level under control of control circuit 24, and primary power switch Q1 can be turned on, and a new switching cycle starts. The above switching cycle repeats, and an output parameter of constant voltage output circuit 22 can be maintained at a desired output voltage under the control of control circuit 24. Also, under the control of control circuit 25, an output parameter of constant current output circuit 23 can be maintained at a desired output current. It should be noted that the operation waveform in FIG. 4 and the control signal generating circuit in FIG. 3 are shown only as examples, and constant voltage output circuit 22 and constant current output circuit 23 may have a different time division of the freewheeling current in certain embodiments. In another example, control circuit 25 may control secondary power switch Q2 to be turned off initially so that the freewheeling current flows through constant voltage output circuit 22 firstly, and then controls secondary power switch Q2 to be turned on so that the freewheeling current then flows through constant current output circuit 23.

A secondary power switch can connect in series in a constant current output circuit, and the first secondary winding and the second secondary winding may be determined to make a reflecting voltage from an output voltage of the second secondary winding to the first secondary winding be less than an output voltage of the first secondary winding. Thus, a freewheeling current may flow completely through the secondary winding of the constant current output circuit when the secondary power switch is turned on, and may flow through secondary windings of other output circuits when the secondary power switch is turned off. The freewheeling current may flow through the constant current output circuit and the constant voltage output circuit in a time division manner in each switching cycle. Only one stage of power conversion may be needed for multiple constant current/voltage outputs, and this example power converter can conversion efficiency, and reduce the size of the system because only one group of magnetic components are used. Moreover, an output terminal of the constant current output circuit can connect to the LED, and one end of the LED may be grounded, so that it is convenient to sample the voltage on the LED to determine whether the LED is short-circuited or open-circuited. In addition, one end of the sampling resistor may be grounded to facilitate the realization of current sampling. Also, one power end of the secondary power switch can be grounded through the sampling resistor, which is convenient to drive and control the secondary power switch.

Figure 5A:
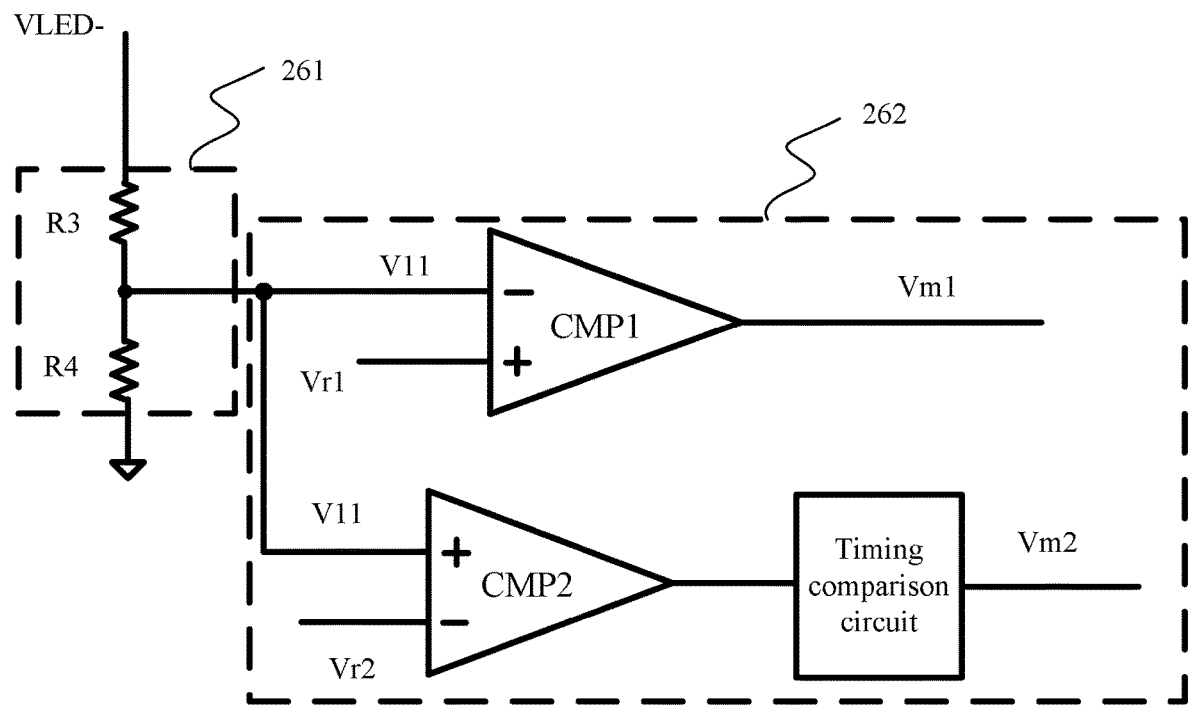
FIG. 5A is schematic block diagram of a first example of a first module, in accordance with embodiments of the present invention.

Referring now to FIG. 5A, shown is schematic block diagram of a first example of a first module, in accordance with embodiments of the present invention. The power converter of the example of FIG. 2 can also include module/ circuit 26. Module 26 can generate a first sampling signal that represents the voltage of the cathode of the LED, in order to determine whether the LED is short-circuited or open-circuited. In FIG. 5, module 26 can include voltage sampling circuit 261 and module/circuit 262. Voltage sampling circuit 261 can generate sampling signal V11 that represents the voltage of the cathode of the LED, and module 262 may receive sampling signal V11, in order to determine whether the LED is short-circuited or open-circuited.

Voltage sampling circuit 261 can include resistor R3 and R4. Resistors R3 and R4 can connect in series between the cathode of the LED shown in FIG. 2 and the second ground. Sampling signal V11 can be generated at the common terminal of resistors R3 and R4. In other examples, sampling signal V11 that represents the voltage of the cathode of the LED may be obtained in any other manner. Module 262 can include comparators CMP1 and CMP2, and a timing comparison circuit. The inverting input end of comparator CMP1 may receive sampling signal V11, the non-inverting input end of comparator CMP1 can receive threshold Vr1, and the output end of comparator CMP1 may output signal Vm1 to determine whether the LED is open-circuited, where threshold Vr1 is a negative value. The non-inverting input end of comparator CMP2 may receive sampling signal V11, the inverting input end of comparator CMP2 can receive threshold Vr2, and the output end of comparator CMP2 can be coupled to the timing comparison circuit. The timing comparison circuit can output signal Vm2 to determine whether the LED is short-circuited, where threshold Vr2 is a negative value, and threshold Vr2 is greater than threshold Vr1. When signal Vm1 is in the first state, it can be determined that the LED is open-circuited, and when signal Vm1 is in the second state, it may be determined that the LED is not open-circuited. Also, when signal Vm2 is in the first state, it can be determined that the LED is short-circuited, and when signal Vm2 is in the second state, it may be determined that the LED is not short-circuited.

Figure 5B:
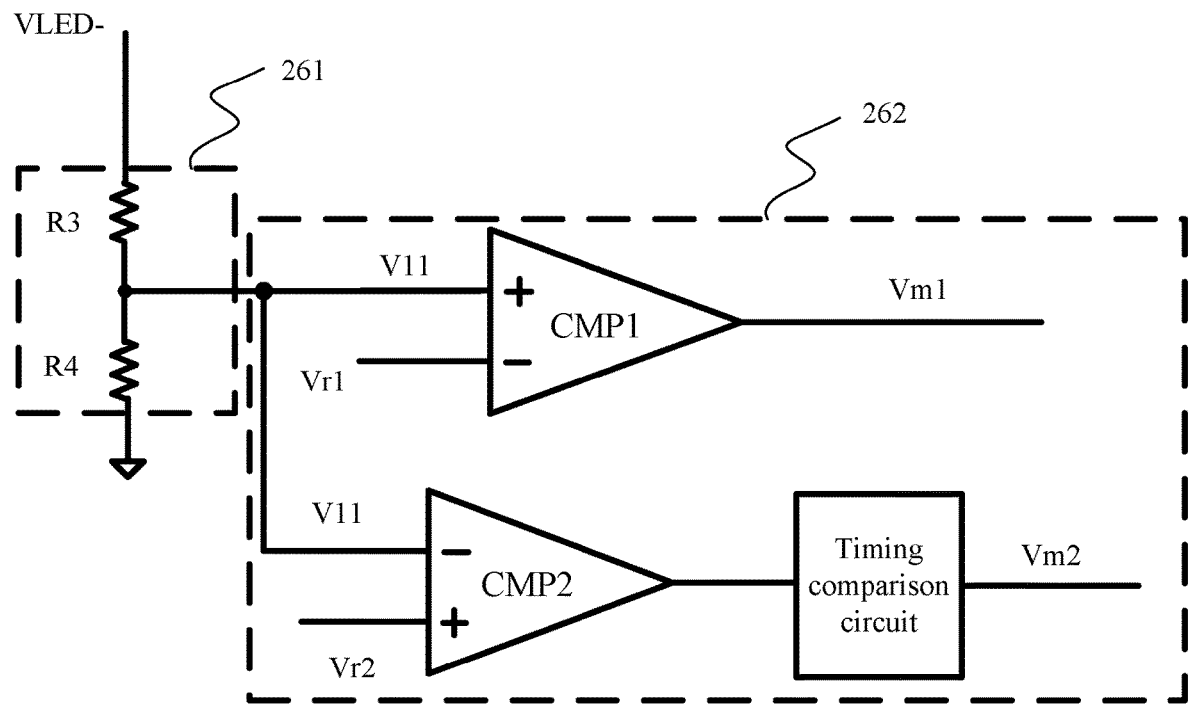
FIG. 5B is schematic block diagram of a second example of a first module, in accordance with embodiments of the present invention.

Referring now to FIG. 5B, shown is schematic block diagram of a second example of a first module, in accordance with embodiments of the present invention. In FIG. 5B, the non-inverting input end of comparator CMP1 may receive sampling signal V11, and the inverting input end of comparator CMP1 may receive threshold Vr1. The inverting input end of comparator CMP2 may receive sampling signal V11, and the non-inverting input end of comparator CMP2 may receive threshold Vr2. In this example, the first state can be low, and the second state can be high. When sampling signal V11 is less than threshold Vr1, it may be determined that the LED is open-circuited. When sampling signal V11 is greater than threshold Vr2, and the time period during which sampling signal V11 is greater than threshold Vr2 reaches a first time threshold, it can be determined that the LED is short-circuited.

In particular embodiments, the timing comparison circuit may begin timing when sampling signal V11 is greater than threshold Vr2, and when a time period during which sampling signal V11 is greater than threshold Vr2 reaches a first time threshold, it can be determined that the LED is short-circuited. Thus, the misjudgment that may be caused by the instantaneous voltage during the normal turn-on process of the power converter can be filtered out. In other examples, the output end of comparator CMP1 may also be coupled to a timing comparison circuit. The timing comparison circuit can begin timing when sampling signal V11 is less than threshold Vr1, and when a time period during which sampling signal V11 is less than threshold Vr1 reaches a second time threshold, it can be determined that the LED is open-circuited. In this way, the misjudgment that may be caused by the instantaneous voltage during the normal turn-on process of the power converter can be filtered out.

In particular embodiments, the anode of the LED can be coupled to the second ground, so it is convenient for sampling the voltage of the cathode of the LED for LED short-circuited protection or LED open-circuited protection. It should be understood that although embodiments have been described with one constant voltage output circuit, the constant voltage output circuit may be more than one. The first control circuit may control the primary power switch in accordance with an output voltage of one of constant voltage output circuits, or an overall output voltage of the constant voltage output circuits. Further, the constant current output circuit in the power converter may be more than one. Each constant current output circuit may have essentially the same structure. Moreover, the second control circuit can include a plurality of control sub-circuits that control secondary power switches in the constant current output circuits respectively. Thus, freewheeling currents may flow simultaneously or in a time division manner through a plurality of constant current output circuits when the primary power switch is turned off, in order to output a constant current.

Figure 6:
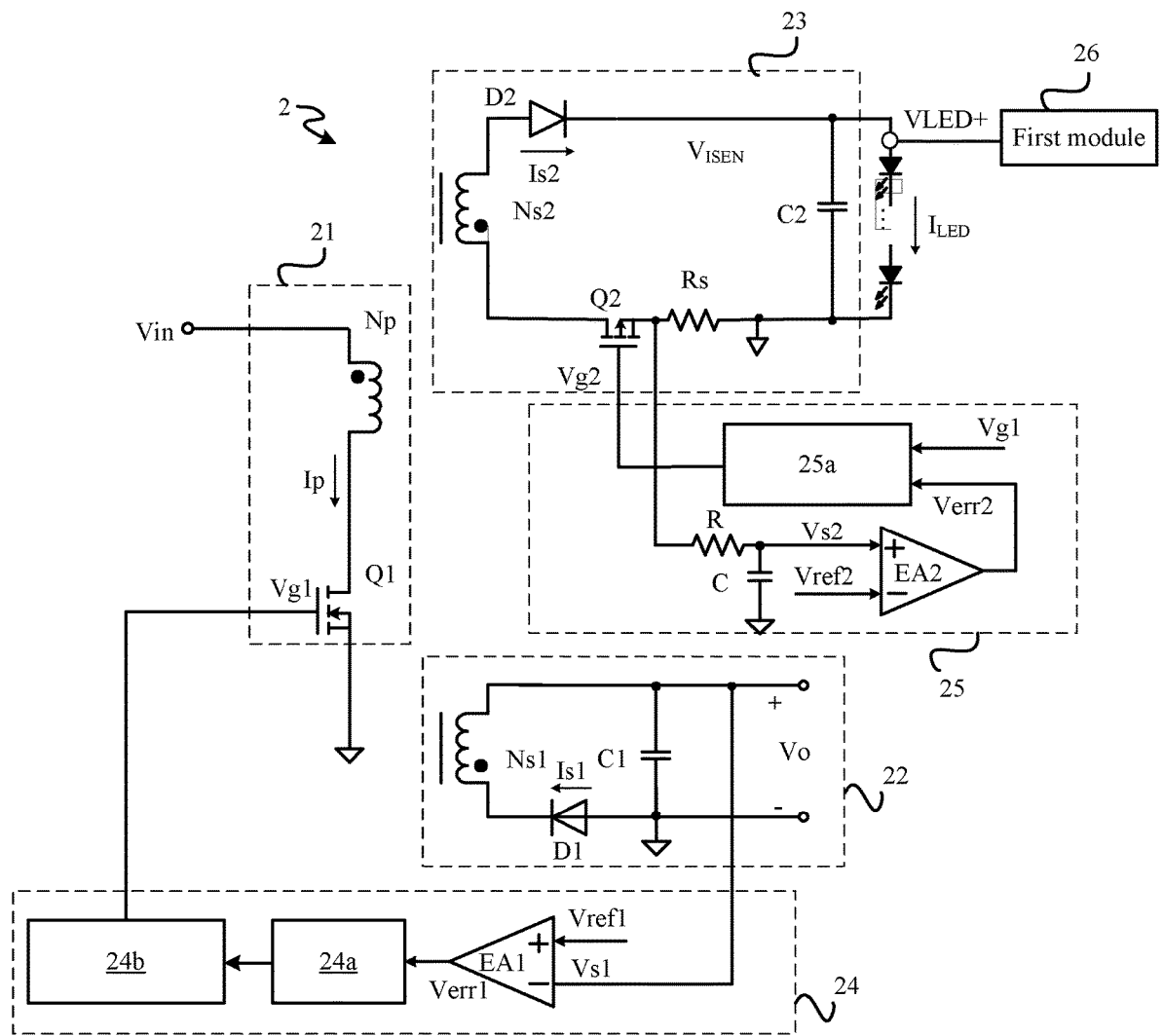
FIG. 6 is a schematic block diagram of a second example power converter, in accordance with embodiments of the present invention.

Referring now to FIG. 6, shown is a schematic block diagram of a second example power converter, in accordance with embodiments of the present invention. In this particular example, power converter 2 can include input circuit 21, at least one constant voltage output circuit 22, at least one constant current output circuit 23, control circuit 24, control circuit 25, and module/circuit 26. Constant current output circuit 23 can include secondary winding Ns2, a current output port, a second rectifier circuit, current sampling circuit Rs, and secondary power switch Q2. The second rectifier circuit can be electrically coupled between the current output port and secondary winding Ns2. The second rectifier circuit can include diode D2 and capacitor C2.

Current sampling circuit Rs and secondary power switch Q2 can connect in series in the constant current output circuit (e.g., connected in series with secondary winding Ns2). For example, current sampling circuit Rs can be a sampling resistor connected between the second ground and the first end of secondary power switch Q2. The second end of secondary power switch Q2 can connect with one end of secondary winding Ns2. For example, the constant current output circuit can connect to an LED as a load. The LED can connect to the current output port, and the cathode of the LED is coupled to the second ground to facilitate sampling the voltage on the LED to determine whether the LED is short-circuited or open-circuited. The anode of the LED can connect to the other end of secondary winding Ns2. In addition, one end of the sampling resistor may be coupled to the second ground to facilitate current sampling, and one power end of the secondary power switch may be coupled to the second ground through the sampling resistor, which can facilitate drive and control the secondary power switch. The LED can be integrated with the entire power converter. Optionally, the secondary power switch is an P-type MOS transistor. In this example, module/circuit 26 may generate a first sampling signal that represents the voltage of the anode of the LED to determine whether the LED is short-circuited or open-circuited.

Figure 7A:
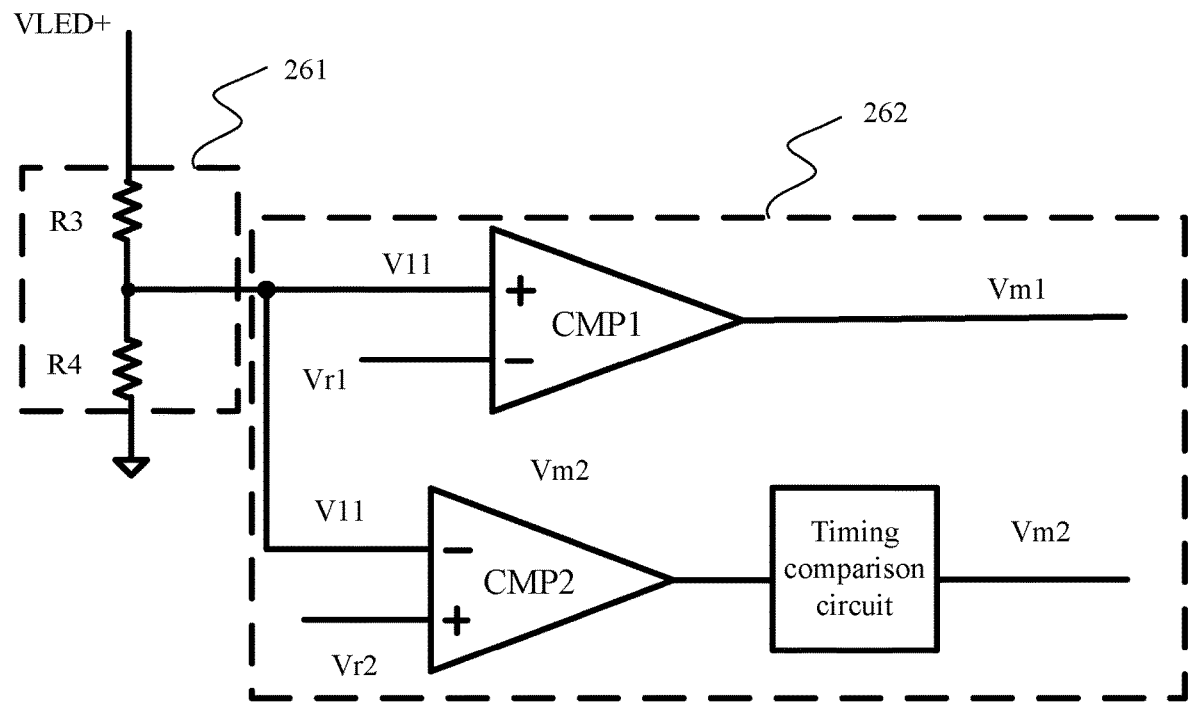
FIG. 7A is schematic block diagram of a first example of a first module, in accordance with embodiments of the present invention.
Figure 7B:
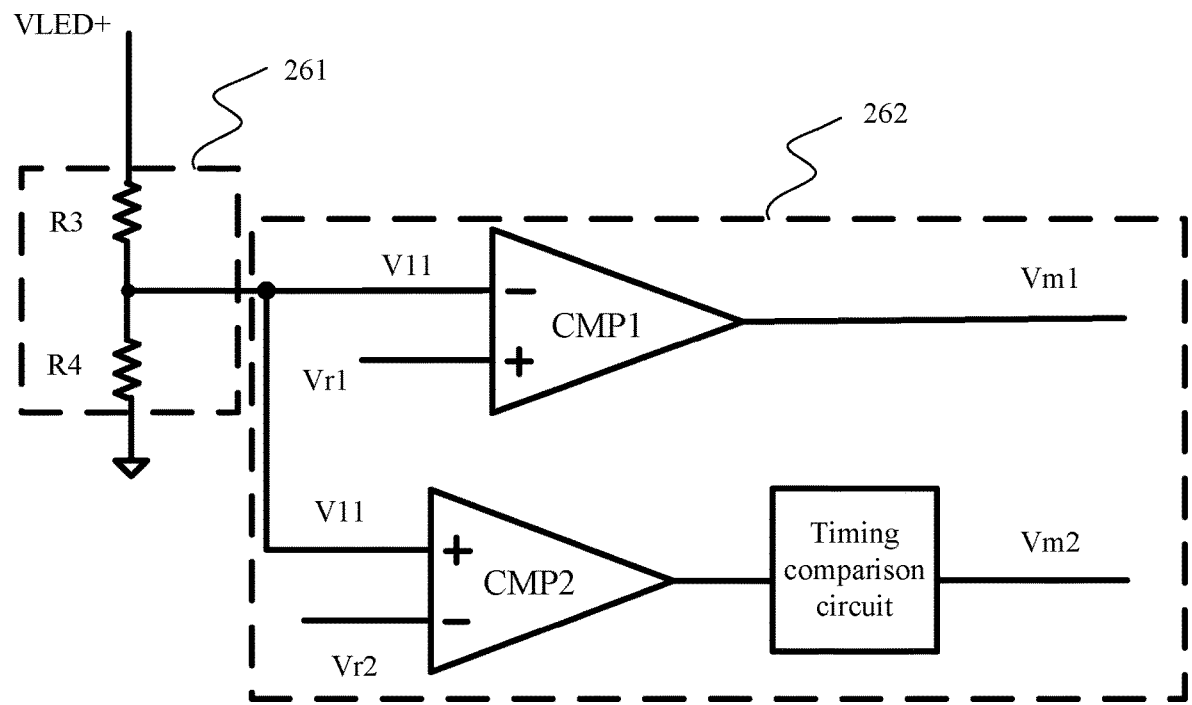
FIG. 7B is schematic block diagram of a second example of a first module, in accordance with embodiments of the present invention.

Referring now to FIG. 7A, shown is schematic block diagram of a first example of a first module, in accordance with embodiments of the present invention. Referring also to FIG. 7B, shown is schematic block diagram of a second example of a first module, in accordance with embodiments of the present invention. In FIG. 7A, module/circuit 26 can include voltage sampling circuit 261 and module/circuit 262. Voltage sampling circuit 261 may generate sampling signal V11 that represents the voltage of the anode of the LED, and module 262 may receive sampling signal V11 to determine whether the LED is short-circuited or open-circuited. Voltage sampling circuit 261 can include resistor R3 and R4. Resistors R3 and R4 can connect in series between the anode of the LED shown in FIG. 6 and the second ground. Sampling signal V11 may be generated at the common terminal of resistors R3 and R4. In other examples, sampling signal V11 that represents the voltage of the anode of the LED may be obtained in any other manner.

Module/circuit 262 can include comparators CMP1 and CMP2, and a timing comparison circuit. The non-inverting input end of comparator CMP1 may receive sampling signal V11, the inverting input end of comparator CMP1 may receive threshold Vr1, and the output end of comparator CMP1 can output signal Vm1 to determine whether the LED is open-circuited, where threshold Vr1 is a positive value. The inverting input end of comparator CMP2 can receive sampling signal V11, the non-inverting input end of comparator CMP2 may receive threshold Vr2, and the output end of comparator CMP2 can be coupled to the timing comparison circuit. The timing comparison circuit may output signal Vm2 to determine whether the LED is short-circuited, where threshold Vr2 is a positive value, and threshold Vr1 is greater than threshold Vr2. When signal Vm1 is in the first state, it may be determined that the LED is open-circuited, and when signal Vm1 is in the second state, it can be determined that the LED is not open-circuited. Also, when signal Vm2 is in the first state, it may be determined that the LED is short-circuited, and when signal Vm2 is in the second state, it can be determined that the LED is not short-circuited.

In FIG. 7B, the inverting input end of comparator CMP1 receives sampling signal V11, and the non-inverting input end of comparator CMP1 may receive threshold Vr1. The non-inverting input end of comparator CMP2 may receive sampling signal V11, and the inverting input end of comparator CMP2 can receive threshold Vr2. In this example, the first state is the low level state, and the second state is the high level state. When sampling signal V11 is greater than threshold Vr1, it can be determined that the LED is open-circuited. Also, when sampling signal V11 is less than threshold Vr2, and the time period during which sampling signal V11 is less than threshold Vr2 reaches a first time threshold, it may be determined that the LED is short-circuited.

In particular embodiments, the timing comparison circuit may start timing when sampling signal V11 is less than threshold Vr2, and when the time period during which sampling signal V11 is less than threshold Vr2 reaches the first time, it can be determined that the LED is short-circuited. Thus, the misjudgment that may be caused by the instantaneous voltage during the normal turn-on process of the power converter can be filtered out. In other examples, the output end of comparator CMP1 may also be coupled to a timing comparison circuit, the timing comparison circuit starts timing when sampling signal V11 is greater than threshold Vr1, and when the time for sampling signal V11 is greater than threshold Vr1 reaches a second time threshold, it can be determined that the LED is open-circuited. Thus, the misjudgment that may be caused by the instantaneous voltage during the normal turn-on process of the power converter can be filtered out. In particular embodiment, the cathode of the LED can be coupled to the second ground, so it is convenient for sampling the voltage of the anode of the LED for LED short-circuited protection or LED open-circuited protection.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A power converter, comprising:
   a) an input circuit having a primary winding and a primary power switch that are coupled in series between an input terminal and a first ground;
   b) a constant voltage output circuit having a first secondary winding coupled with said primary winding;
   c) a constant current output circuit having a second secondary winding coupled with said primary winding, a secondary power switch, a current output port, a second rectifier circuit, and a current sampling circuit;
   d) wherein the second rectifier circuit is coupled between the current output port and the second secondary winding, the current output port is coupled to an LED load, the LED load, the current sampling circuit, and the secondary power switch are coupled in series between two terminals of the second secondary winding, and a common node between the LED load and the current sampling circuit is coupled to a second ground; and
   e) wherein one power terminal of the secondary power switch is coupled to the second ground through the current sampling circuit, wherein the current sampling circuit is coupled in series with the LED load in order to sample a current flowing through the LED load, and wherein a first sampling signal representing a voltage of the LED load is sampled and employed to determine whether the LED load is short-circuited or open-circuited.

2. The power converter of claim 1, wherein an anode of the LED load is coupled to the second ground, and the first sampling signal represents a voltage of a cathode of the LED load.

3. The power converter of claim 2, wherein when the first sampling signal is less than a first threshold, it is determined that the LED load is open-circuited, wherein the first threshold is a negative value.

4. The power converter of claim 2, wherein when the first sampling signal is greater than a second threshold, and a time period during which the first sampling signal is greater than the second threshold reaches a first time threshold, it is determined that the LED load is short-circuited, wherein the second threshold is a negative value.

5. The power converter of claim 2, wherein the secondary power switch is configured as an N-type MOS, and a source of the secondary power switch is coupled to the second ground through the current sampling circuit.

6. The power converter of claim 1, wherein a cathode of the LED load is coupled to the second ground, and the first sampling signal represents a voltage of an anode of the LED load.

7. The power converter of claim 6, wherein when the first sampling signal is greater than a first threshold, it is determined that the LED load is open-circuited, wherein the first threshold is a positive value.

8. The power converter of claim 6, wherein when the first sampling signal is less than a second threshold, and a time period during which the first sampling signal is less than the second threshold reaches a first time threshold, it is determined that the LED load is short-circuited, wherein the second threshold is a positive value.

9. The power converter of claim 6, wherein the secondary power switch is configured as a P-type MOS, and a source of the secondary power switch is coupled to the second ground through the current sampling circuit.

10. The power converter of claim 1, wherein the power converter further comprises a first module, the first module comprises a voltage sampling circuit and a second module, the voltage sampling circuit generates the first sampling signal that represents a voltage of a non-ground end of the LED load, and the second module receives the first sampling signal to determine whether the LED load is short-circuited or open-circuited.

11. The power converter of claim 10, wherein:
   a) the second module comprises a first comparator, a second comparator, and a timing comparison circuit;
   b) a first input end of the first comparator receives the first sampling signal, a second input end of the first comparator receives a first threshold, and an output end of the first comparator outputs a first signal to determine whether the LED load is open-circuited; and
   c) a first input end of the second comparator receives the first sampling signal, a second input end of the second comparator receives a second threshold, and an output end of the second comparator is coupled to the timing comparison circuit, the timing comparison circuit outputs a second signal to determine whether the LED load is short-circuited.

12. The power converter of claim 1, wherein the constant voltage output circuit is out of operation when the secondary power switch is turned on.

13. The power converter of claim 1, wherein the first secondary winding and the second secondary winding are determined to make a reflecting voltage from an output voltage of the second secondary winding to the first secondary winding be less than an output voltage of the first secondary winding.

14. The power converter of claim 1, wherein:
   a) the primary power switch and the secondary power switch have the same switching cycle; and
   b) the secondary power switch is turned on for at least a portion of a period during which the primary power switch is turned off to maintain an output current of the constant current output circuit constant.

15. The power converter of claim 1, wherein the second rectifier circuit comprises a rectifier transistor and a capacitor, the capacitor is coupled in parallel with the LED load, and the rectifier transistor is coupled in series with the second secondary winding.

16. The power converter of claim 1, wherein the power converter further comprises:
   a) a first control circuit configured to control the operation of the primary power switch to adjust an output voltage of the constant voltage output circuit; and
   b) a second control circuit configured to control the operation of the secondary power switch to adjust an output current of the constant current output circuit.

17. The power converter of claim 1, wherein the constant voltage output circuit further comprises:
   a) a voltage output port;
   b) a first rectifier circuit coupled between the voltage output port and the first secondary winding; and
   c) wherein the primary power switch is controlled to be turned on and off to maintain an output voltage of the constant voltage output circuit constant.

18. The power converter of claim 1, wherein the first sampling signal represents a voltage of an anode or a cathode of the LED load.

* * * * *